United States Patent

Leroux et al.

[19]

[11] Patent Number: 5,844,958
[45] Date of Patent: Dec. 1, 1998

[54] DISMOUNTABLE FUEL ASSEMBLY OF A NUCLEAR REACTOR COOLED BY LIGHT WATER

[75] Inventors: Jean-Claude Leroux, Villeurbanne; Pascal Burfin, Saint-Genis-les-Ollieres, both of France

[73] Assignees: Framatome, Courbevoie; Cogema, Velizy-Villacoublay, both of France

[21] Appl. No.: 676,131

[22] PCT Filed: Dec. 28, 1994

[86] PCT No.: PCT/FR94/01548

§ 371 Date: Jul. 1, 1996

§ 102(e) Date: Jul. 1, 1996

[87] PCT Pub. No.: WO95/18451

PCT Pub. Date: Jul. 6, 1995

[30] Foreign Application Priority Data

Dec. 30, 1993 [FR] France ................................. 93 15935

[51] Int. Cl.⁶ ........................................................ G21C 3/30
[52] U.S. Cl. ............................................. 376/446; 376/353
[58] Field of Search ...................... 376/446, 353, 376/440

[56] References Cited

U.S. PATENT DOCUMENTS 3,953,287  4/1976  Long et al. .
4,064,004  12/1977  Long et al. ............................... 376/440
4,219,386  8/1980   Osborne et al. ......................... 376/446
4,617,171  10/1986  Feutrel ..................................... 376/446
4,631,168  12/1986  Shallenberger et al. ................ 376/446
5,268,948  12/1993  Church et al. ........................... 376/446
5,361,283  11/1994  Attix ........................................ 376/446
5,363,423  11/1994  Brashier et al. ......................... 376/446
5,367,548  11/1994  Attix ........................................ 376/446

FOREIGN PATENT DOCUMENTS

0 073 728 A1  3/1983  European Pat. Off. .
0360664       3/1990  European Pat. Off. ............... 376/446
2 341 917     9/1977  France .

*Primary Examiner*—Harvey E. Behreno
*Attorney, Agent, or Firm*—Pollock, Vande Sande & Priddy

[57] ABSTRACT

The fuel assembly includes an arrangement for quickly fixing the guide thimble into an opening passing through the adaptor plate of a dismountable nozzle of the assembly. This arrangement includes at least two bearing stops inside the opening of the nozzle, a bearing sleeve integral with the end of the guide thimble and a locking ring which includes stops for bearing on bearing surfaces of the stops inside the opening of the nozzle and deformable elastic parts capable of being accommodated in cavities of the opening of the adaptor plate or of the bearing sleeve, in order to place the ring in a position in which the guide thimble is locked or unlocked. The sleeve includes a rim for bearing on a bearing surface of the adaptor plate at the periphery of the opening.

8 Claims, 9 Drawing Sheets

DISMOUNTABLE FUEL ASSEMBLY OF A NUCLEAR REACTOR COOLED BY LIGHT WATER

FIELD OF THE INVENTION

The invention relates to a dismountable fuel assembly of a nuclear reactor cooled by light water, and in particular to a dismountable fuel assembly of a reactor cooled by pressurized water.

BACKGROUND OF THE INVENTION

Nuclear reactors cooled by water, and particularly pressurized-water nuclear reactors, include assemblies consisting of a bundle of very long fuel rods arranged parallel to one another and held in a framework formed by guide thimbles, spacers, and two end nozzles. The guide thimbles are arranged in the longitudinal direction of the assembly and are connected to transverse spacers spaced evenly along the length of the assembly.

The guide thimbles are also connected at each of their ends to one of two nozzles, constituting components for stiffening and closing the assembly.

The fuel rods of the assembly constitute a bundle in which the rods are parallel to each other and arranged in the transverse sections of the assembly, in a uniform pattern defined by the spacers. Some positions of the bundle are occupied by guide thimbles which are generally connected rigidly to the spacers.

The guide thimbles are longer than the fuel rods and are placed in the bundle so as to include a part which projects relative to the bundle of fuel rods at each of their ends. The nozzles are fixed to these projecting end parts of the guide thimbles so as to close the assembly at each of its ends.

The fuel rods consist of sintered pellets of nuclear fuel substance stacked up inside metal cladding isolating the pellets from the fluid surrounding the fuel assembly. In the event of the cladding of a rod of a fuel assembly breaking, it is necessary to replace this rod very rapidly in order to avoid leaks of radioactive product into the fluid for cooling the reactor. In order to gain access to the fuel rods and replace them, it is necessary to dismount one of the nozzles of the assembly, which involves eliminating the links between the end parts of the guide thimbles and the nozzle.

The nozzles include a transverse plate, termed adaptor plate, including through-holes reproducing the pattern of the guide thimbles in each of which a guide thimble is engaged and fixed.

To replace the defective rods in fuel assemblies, novel fuel assemblies including guide thimbles have been designed and developed in which the link with at least one of the end nozzles is dismountable.

In order to replace the defective fuel rods, the assembly is placed under water in a vertical position, in a pit, such that such as a storage pit; the assembly rests on the bottom of the pit via one of its nozzles, or bottom nozzle. The other nozzle or top nozzle, is accessible under a certain depth of water from the top of the pit.

In one type of known dismountable fuel asembly, those parts of the guide thimbles which are engaged in the top nozzle of the assembly include a radially expansible part, which may, for example, be a split bush connected to the end of the guide thimble. An immobilizing sleeve inserted inside the guide thimble radially expands the split bush and fastens the guide thimble, a radially projecting part of which becomes accommodated inside a cavity machined in the nozzle.

Such a device requires special forming of the end of the guide thimble which is to be engaged inside the adaptor plate of the nozzle.

Furthermore, the fitting and extraction of the sleeves for immobilizing the guide thimbles when assembling or dismounting the fuel assembly require special tools allowing tension or thrust to be exerted on the immobilizing sleeve and allowing the immobilizing sleeves to be dismounted and removed, leading to the formation of radioactive waste.

Fuel assemblies have also been proposed which include linking means which can be maneuvered quickly by turning an immobilizing element through a fraction of a turn, in order to lock or unlock the link between a tie for holding the assembly and the dismountable nozzle.

Such devices are described, for example, in U.S. Pat. No. 4,064,004 and U.S. Pat. No. 5,268,948, have a complicated structure and many components.

Furthermore, these devices require the guide thimble to project above the adaptor plate of the nozzle and include parts projecting above the adaptor plate which are fixed to the end of the guide thimble and have an appreciable height which is incompatible with the use of consumable poison clusters. These parts include a bearing plate coming into a superposed arrangement relative to the adaptor plate of the fuel assembly, when the consumable poison rods are inserted into the guide thimbles of the fuel assembly.

The device according to U.S. Pat. No. 5,268,948 may include a sleeve fixed to the guide thimble and coming to bear under the adaptor plate of the nozzle, and two components which are also mounted on the end of the guide thimble so that they can move in rotation relative to one another about the axis of the guide thimble. One of these components is a ring rotatably mounted on the guide thimble and including two radially projecting parts. The adaptor plate of the nozzle is traversed by an opening of constant cross-section, the shape of the opening corresponding to the shape of the transverse section of the ring. The ring is mounted on the end of the guide thimble projecting out of the opening of the plate, and a second component fixed to the end of the guide thimble is provided in order to immobilize the ring in the position in which the guide thimble is locked or in the position in which it is unlocked. The device for fixing the guide thimble is therefore, in the main, situated outside the nozzle above the adaptor plate.

SUMMARY OF THE INVENTION

The object of the invention is to provide a fuel assembly of a nuclear reactor cooled by light water and including a bundle of parallel fuel rods held in a framework formed by guide thimbles or solid ties, spacers and end nozzles fixed onto the ends of the guide thimbles or ties, at least one of the nozzles being fixed onto one of the ends of each of the guide thimbles or ties in a dismountable manner, via an end part of the guide thimble which is engaged in an opening passing through a transverse plate of the nozzle, associated with quick dismountable means for fixing the guide thimble including a bearing sleeve integral with the end of the guide thimble comprising at least one bearing rim intended to come into contact with a face of the adaptor plate on the periphery of the opening and a ring mounted coaxially around the sleeve for rotation about the sleeve and including at least two bearing stops projecting radially and separated by at least two axial passages and at least one part with elastic radial deformation, these fixing means being placed inside the adaptor plate, so that the end of the guide thimble can be flush with the external face of the nozzle.

To this end, the opening in the nozzle has at least two bearing stops projecting inwards, separated by at least two axial passages and including a bearing surface for the stops of the ring perpendicular to the axis of the opening, inside the opening, at least one of the two elements: opening of the nozzle and bearing sleeve including radial openings for receiving the part with elastic deformation of the ring, for immobilizing the ring in a position in which the bearing sleeve is locked inside the opening of the adaptor plate or in an unlocked position, the bearing sleeve, when it does not have a receiving opening for immobilizing the ring, comprising at least two bearing stops separated by at least two passages of axial direction.

BRIEF DESCRIPTION OF THE DRAWINGS

In order to make the invention easy to understand, a fuel assembly according to the invention, including means for quickly fixing the guide thimbles to the adaptor plate of a nozzle will now be described, by way of example, with reference to the appended drawings.

FIGS. 5, 6 and 7 show a first embodiment of the means for quick fixing of a guide thimble of a fuel assembly according to the invention.

FIGS. 8 and 9 show to an alternative of the first embodiment.

FIGS. 10, 11 and 12 show to a second embodiment of the means for fixing a guide thimble inside an opening in the adaptor plate of the nozzle of a fuel assembly according to the invention.

DESCRIPTION OF PREFERRED EMBODIMENTS

Figure 1:
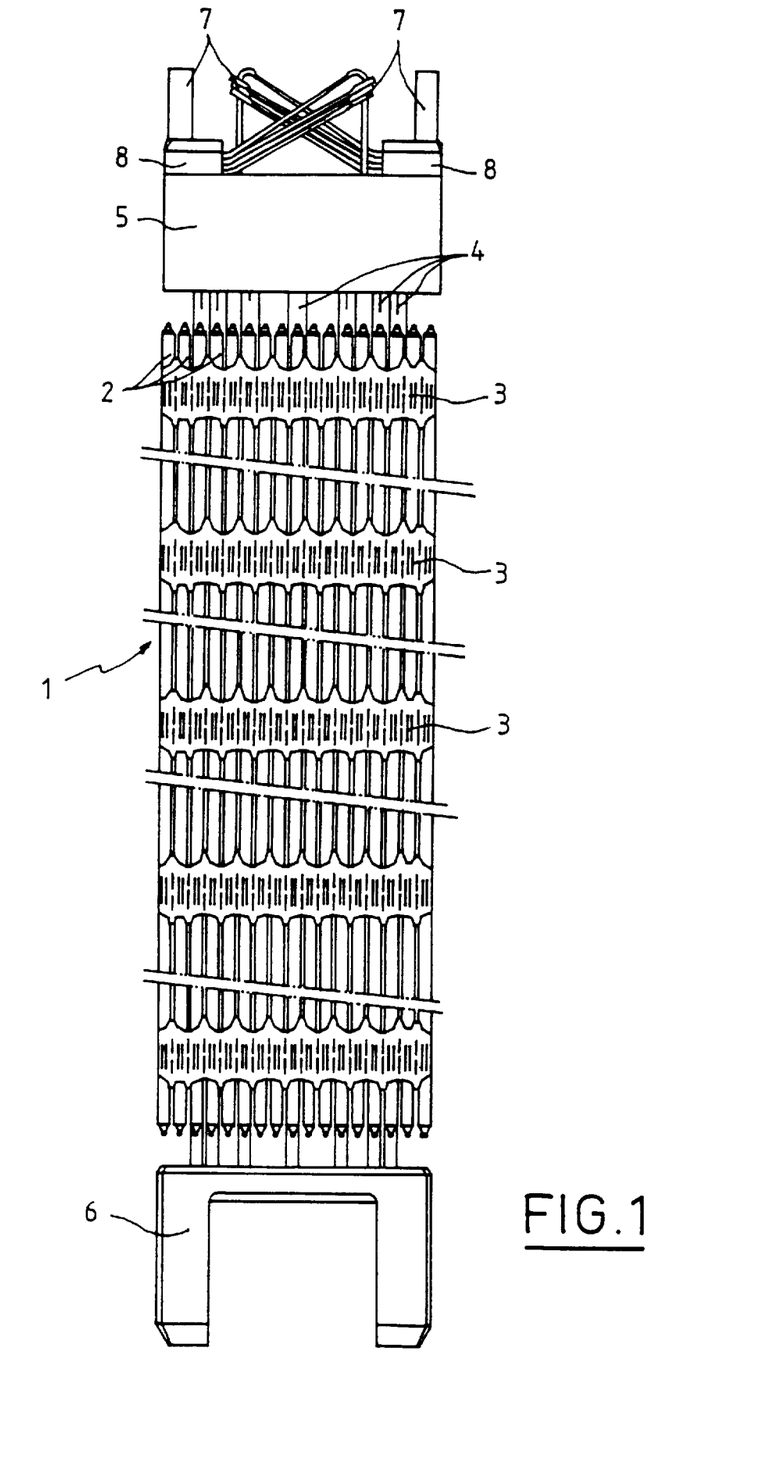
FIG. 1 is an elevation of a fuel assembly of a pressurized-water nuclear reactor.

FIG. 1 shows a fuel assembly 1 consisting of a bundle of parallel fuel rods 2 held by spacers 3 arranged with a certain spacing along the length of the rods 2. The spacers 3 consist of grids whose cells each receive one fuel rod. Some positions in the pattern of the grids are occupied by guide thimbles 4, which are longer than fuel rods 2.

The guide thimbles 4 are connected at one of their ends to a nozzle 5 constituting the top nozzle of the fuel assembly, and at their other end to a second nozzle constituting the bottom nozzle.

When the assembly is in a storage position under water in a pit, the top nozzle 5 is accessible from the top of the pit. This top nozzle 5 has leaf springs 7 which hold the assembly within the core of the reactor in which the top core plate comes to rest on the springs 7. The nozzle also includes studs 8 which project relative to its upper face.

Figure 2:
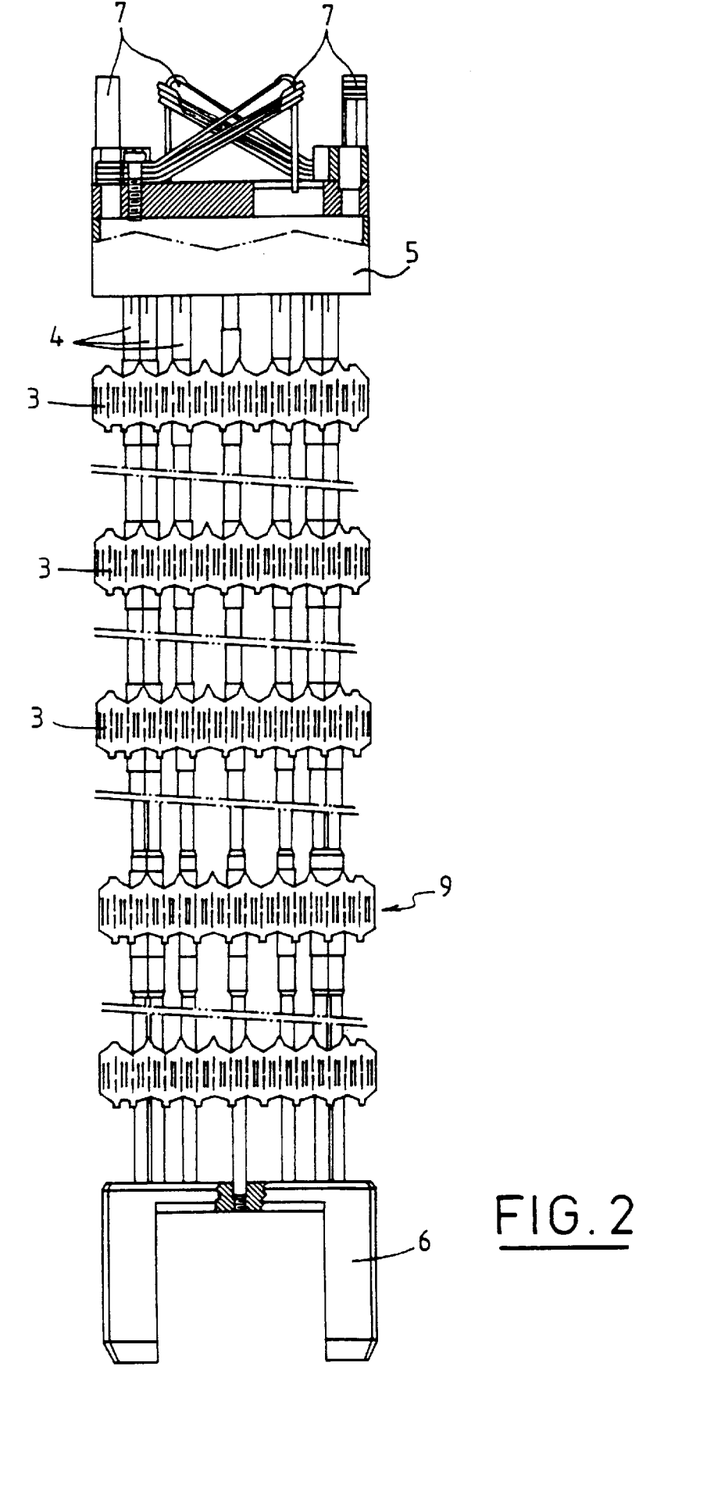
FIG. 2 is an elevation of the framework of the assembly represented in FIG. 1.

FIG. 2 shows the framework 9 of the fuel assembly, including the guide thimbles 4, spacers 3 and the end nozzles 5 and 6. This framework 9 acts as a housing for the fuel rods 2 of the bundle which may be inserted into or extracted from the framework when the upper nozzle 5 is removed. In order to replace or withdraw rods, quick dismountable connections between the end of the guide thimbles 4 and the top nozzle 5 are provided.

Figure 3:
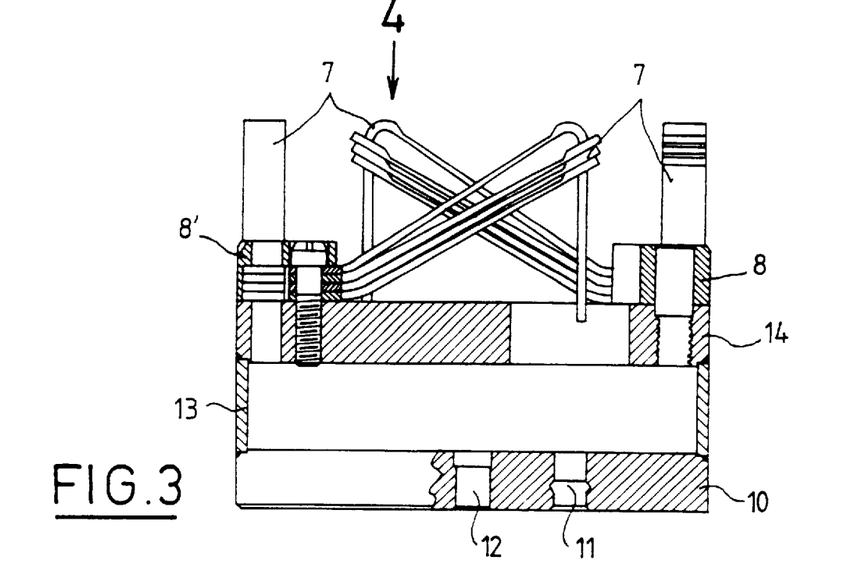
FIG. 3 is an elevation with partial section of the top nozzle of the fuel assembly.
Figure 4:
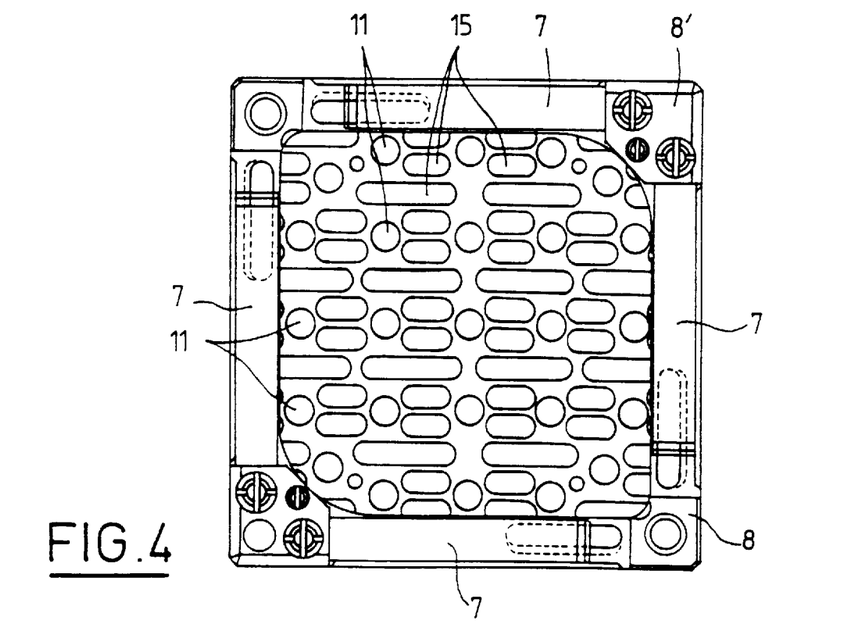
FIG. 4 is a plan view in the direction of arrow 4 of the top nozzle represented in FIG. 3.

FIGS. 3 and 4 show a top nozzle of a fuel assembly including an adaptor plate 10 into which the guide thimbles are engaged inside openings 11 passing through this adaptor plate and accessible from the upper part of the fuel assembly.

The instrumentation guide thimble for the fuel assembly situated in the central part is received in an opening 12 of specific shape. The top nozzle of the assembly consists of the adaptor plate and of a frame 14 joined together via a skirt 13 welded to the plate 10 and to the frame 14. The frame 14 has bosses 8 including the centering openings and the clamping collars 8' for holding the springs 7.

As can be seen in FIG. 4, the through-holes 11 allowing the guide thimbles 4 to be fixed are placed in defined positions corresponding to the positions of the twenty-four guide thimbles of the assembly. Holes 15 for the passage of water pass through the adaptor plate 10 of the nozzle between the through-openings 11 of the guide thimbles.

Figures 5, 6:
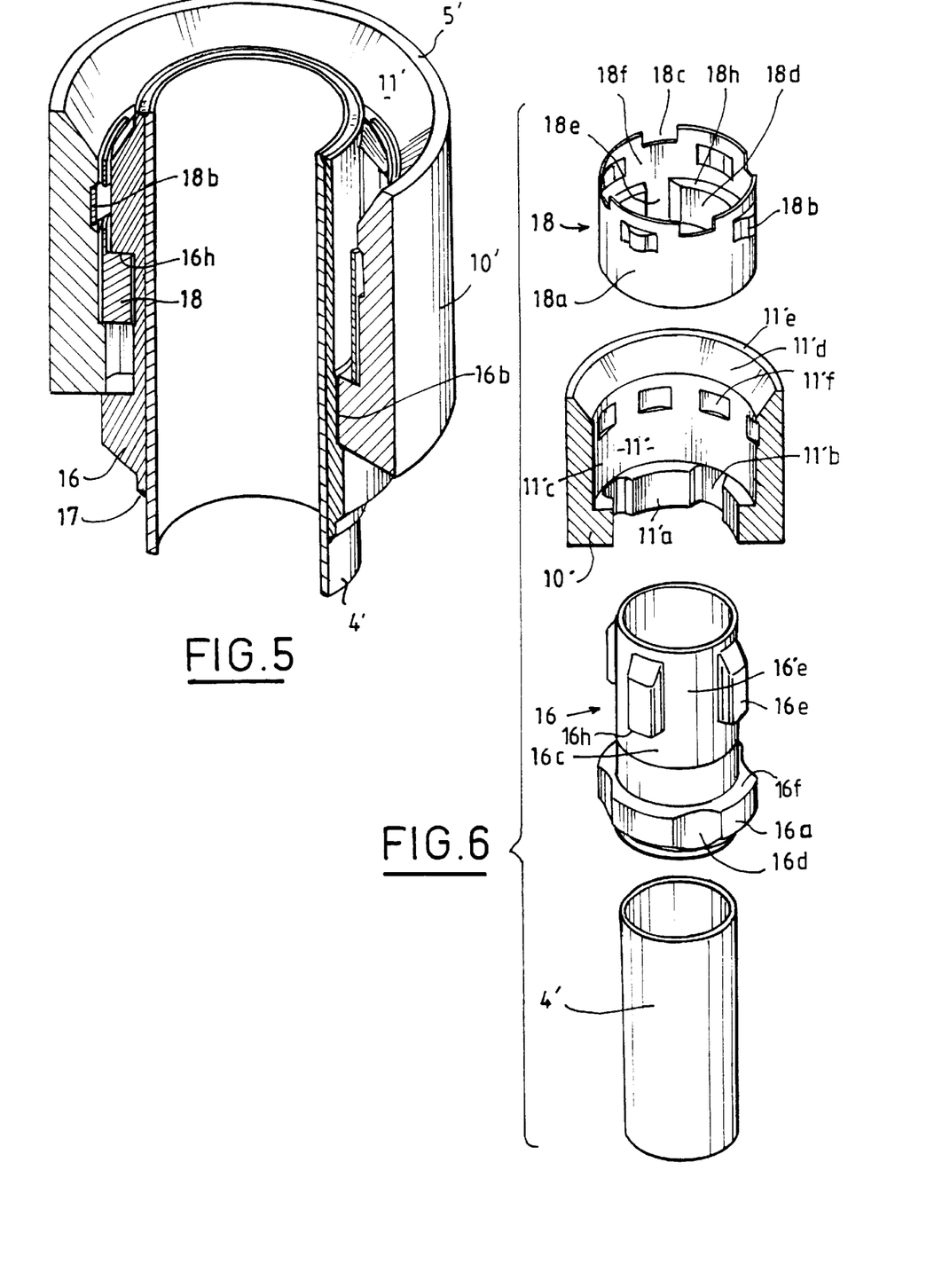
FIG. 5 is a view in perspective and in partial section of the end part of a guide thimble engaged and fixed in the adaptor plate of the fuel assembly via the fixing means according to the first embodiment.
FIG. 6 is an exploded perspective view of the means for fixing the guide thimble represented in FIG. 5, in its non-assembled state.
Figure 7:
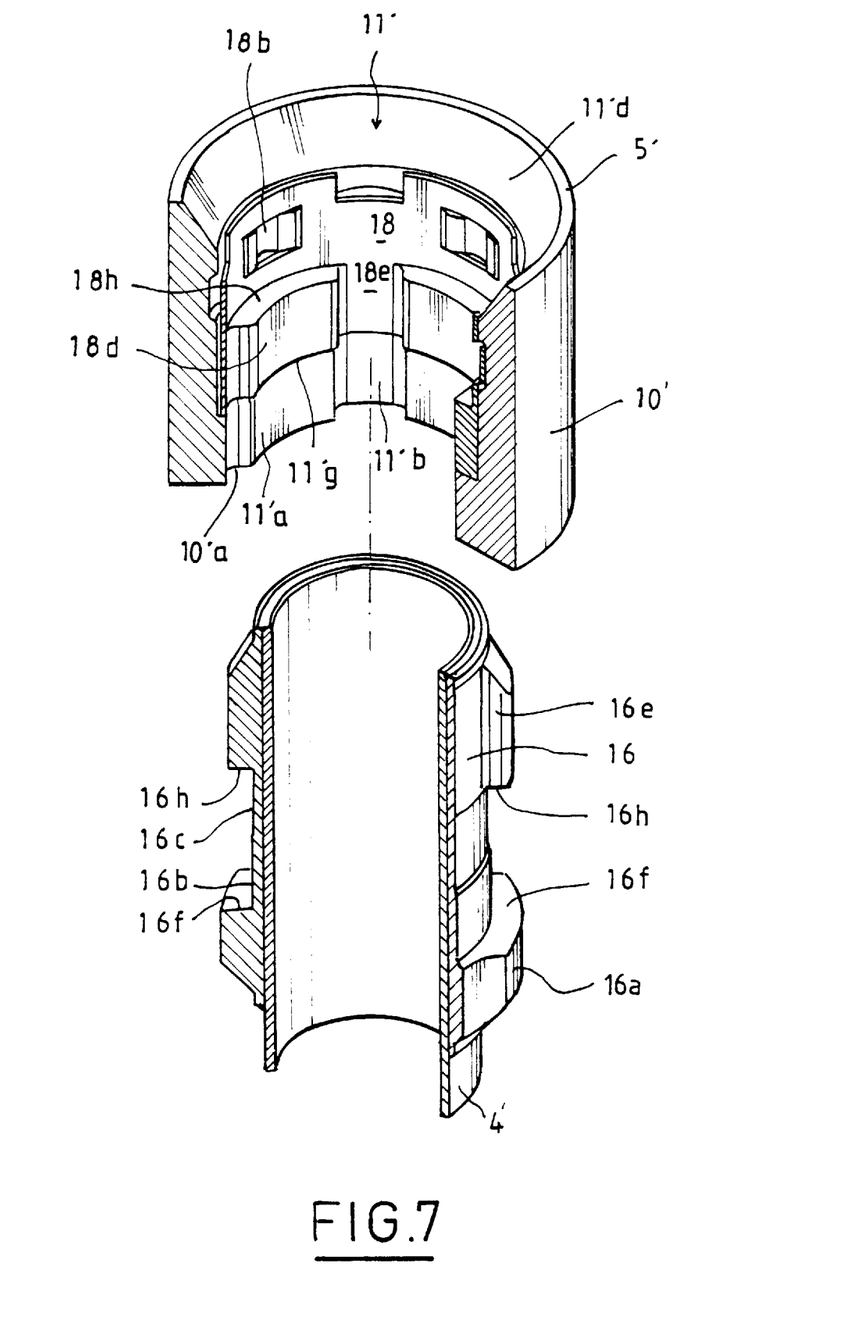
FIG. 7 is an exploded perspective view with cutaway of the end part of a guide thimble and of the means for fixing the guide thimble acording to the first embodiment, in an assembled state, the guide thimble being in a position where it is not fixed inside the opening of the adaptor plate of a nozzle.

FIGS. 5, 6 and 7 show a first embodiment of means for fixing the end part 4' of a guide thimble of the fuel assembly represented in FIG. 1 inside an opening 11' passing through the adaptor plate 10' of a dismountable nozzle of a fuel assembly according to the invention.

In FIG. 5, the fixing means have been represented in their assembled position, the guide thimble being engaged and fixed inside the adaptor plate 10' of the nozzle.

In FIG. 6, the fixing means have been represented separately in their disassembled position.

In FIG. 7, the fixing elements have been represented in their assembled position at the end of the guide thimble and inside the opening in the adaptor plate, the guide thimble being in a disengaged position relative to the opening in the adaptor plate.

The fixing means include a bearing sleeve 16, the opening 11' in the adaptor plate 10' and a locking and unlocking ring 18.

The end of the guide thimble 4' has no machining nor any particular forming.

The bearing sleeve 16 includes, at one of its ends, a collar 16a having a planar upper bearing surface 16f intended to constitute a bearing rim coming into contact with a planar lower bearing face 10'a of the adaptor plate 10', around the opening 11'.

The collar 16a of the bearing sleeve 16 additionally has four indentations 16d evenly distributed about the collar 16a and intended to allow the passage of fuel rods of the assembly when they are being extracted or refitted into the assembly, after the top nozzle 5' has been dismounted.

Above the bearing rim 16f of the collar 16a, the sleeve 16 includes a smooth cylindrical part 16b and then a smooth cylindrical part 16c, the diameter of the cylindrical part 16c being slightly less than the diameter of the smooth part 16b.

The cylindrical part 16b constitutes a surface for bearing on a corresponding cylindrical centering and positioning part of the opening 11' in the adaptor plate 10'.

The bearing sleeve 16 additionally includes stops 16e projecting radially outwards relative to the cylindrical surface 16c and evenly distributed around the periphery of the hoop 16c of the bearing sleeve 16 and separated by axial passages 16'e between two successive stops 16e.

In the embodiment represented in FIGS. 5 to 7, the bearing sleeve 16 includes four stops 16e arranged at intervals of 90° about the axis of the sleeve.

More generally, the bearing sleeve 16 includes at least two projecting stops 16e separated by at least two axial passages 16'e between two successive stops which extend longitudinally over a certain length of the hoop 16c of the sleeve 16.

Below the collar 16a, the sleeve 16 includes a rim projecting downwards and via which the sleeve 16 can be fixed by a weld (17) or other fixing means onto the end of the thimble 4' engaged inside the bore in the sleeve over the entire height of the sleeve.

The internal bore in the sleeve 16 has a diameter slightly greater than the outside diameter of the guide thimble 4', so that the sleeve 16 can be slipped over the end of the thimble 4' in the assembled position, as represented in FIGS. 5 and 7.

The lower part of opening 11' in the adaptor plate 10' is machined in order to constitute four bearing stops 11'a arranged at 90° about the axis of the opening 11', machined on just part of the opening 11 and separated by axial passages 11'b whose width in the circumferential direction is very slightly greater than the width of the stops 16e of the bearing sleeve 16, so as to allow the end of the guide thimble 4' on which the bearing sleeve 16 is fixed to be engaged in the axial direction inside the opening 11' until the rim 16f of the collar 16a of the sleeve 16 comes to bear on the planar lower surface 10'a of the adaptor plate.

The number, dimension and arrangement of the projecting stops allow the bearing sleeve 16 integral with the end of the guide thimble 4' to be engaged axially inside the opening in the adaptor plate. The shape and width of the axial passages 11'b of the opening 11' correspond substantially to the shape and width of the stops 16e of the sleeve and the shape and dimension of the stops 11'a of the opening 11' correspond substantially to the shape and to the width of the axial passages 16'e of the sleeve 16. The stops 11'a include bearing surfaces perpendicular to the axis of the opening, inside the opening 11.

The adaptor plate 10' is additionally machined, inside the opening 11', above bearing surfaces for the stops 11'a, into a smooth cylindrical part 11'c of the opening 11', in order to constitute eight radial cavities 11'f arranged at 45° from one another about the axis of the opening 11' and therefore two sets of four cavities arranged at 90° from one another.

Above the cavities 11'f, the opening 11' has a frustoconical part 11'd flared outwards and emerging at the upper end of the opening 11'.

The locking ring 18 is in the shape of a cylindrical hoop 18a whose outside diameter is slightly less than the inside diameter of cylindrical part 11'c of the opening 11'.

The ring 18 includes four stops 18d projecting radially towards the inside of the cylindrical hoop constituting the standing part 18f of the guide ring 18 and separated by axial passages 18e.

The dimension of the projecting stops 18d in the circumferential direction corresponds to the dimension in the circumferential direction of the stops 11'a machined inside the opening 11'.

The hoop of the ring 18 additionally includes parts 18b in the form of small elastic bosses which can deform elastically in radial directions.

The cross-section of the small bosses 18b corresponds to the cross-section of the cavities 11'f of the opening 11', so that the small radially deformable bosses 18b projecting radially towards the outside of the hoop of the ring 18 can be accommodated in cavities 11'f when the ring 18 is engaged inside the cylindrical part 11'c of the opening 11' above the stops 11'a, as represented in FIGS. 5 and 7.

The cylindrical hoop of the ring 18 has a diameter very slightly less than the inside diameter of the smooth cylindrical part 11'c of the opening 11'. In the embodiment represented in FIGS. 5 to 7, the ring 18 includes four small elastically deformable bosses 18b arranged at 90° from one another about the axis of the ring 18.

The upper part of ring 18 in addition includes four openings 18c in the form of crenellations which are distributed at 90° about the axis of the ring 18 and arranged each substantially equidistant between two small elastically deformable bosses 18b.

In order to fit and fix the end of a guide thimble 4' in an opening 11' in the adaptor plate 10', firstly, the means for fixing the guide thimble 4' are assembled as represented in FIG. 7. The bearing sleeve 16 is fixed and welded to the end of the guide thimble and the ring 18 is engaged inside the smooth cylindrical part 11'c of the opening 11' in the adaptor plate 10'. The ring 18 is oriented so that the stops 18d of the ring 18 come into perfectly superposed positions relative to the stops 11'a of the opening 11'; simultaneously, of course, the axial passages 11'b between the stops 11'a and the axial passages 18e between the stops 18d of the ring 18 find themselves in perfectly aligned positions. In this position, the elastic tabs 18b engage in a first series of four cavities 11'f arranged at 90° from one another about the axis of the opening 11'.

It should be noted that the end part of the ring 18 including crenellations 18c is accessible from the top of the adaptor plate 10', owing to the presence of the flared end part 11'd of the opening 11'. A tool including stubs capable of engaging in the crenellations 18c of the ring 18 can be inserted inside the flared end part 11'd of the opening 11'. The tool therefore makes it possible to turn the ring 18 about its axis, which is coincident with the axis of the opening 11' in which the ring 18 is mounted with a small amount of radial clearance.

The stops 11'a of the opening 11' and the stops 18d of the ring 18 which have identical shapes have a cylindrical inside surface having, as axis, the axis of the ring and the axis of the opening which are coincident in the position of engagement of the ring 18 in the opening 11' as represented in FIGS. 5 and 7.

The internal cylindrical surface of the stops 11'a and 18d has a diameter slightly greater than the diameter of the cylindrical part 16c of the bearing sleeve 16 and substantially equal to the diameter of the cylindrical part 16b of the bearing sleeve 16, so that in the position of engagement of the sleeve inside the opening 11' as represented in FIG. 5, the cylindrical surface 16b of the sleeve 16 is in perfect contact with the internal surface of the stops 11'a which provide perfect centering of the bearing sleeve 16 and of the thimble 4' inside the opening 11'.

The distance in the axial direction between the bearing ring 16f and the lower rim 16h of the bearing stops 16e of the bearing sleeve 16 is slightly greater than the sum of the dimensions in the axial direction of the bearing stops 11'a and 18d placed in a superposed position in the axial direction, when the ring 18 is fitted, as represented in FIG. 7.

In order to mount and fix the nozzle on the end of the guide thimble 4' equipped with the sleeve 16, as represented in FIG. 7, the nozzle including the adaptor plate 10' is engaged over the end of the guide thimble 4' via its opening 11; oriented such that the bearing stops 16e of the bearing sleeve are inserted by sliding axially through the aligned axial passages 11'b and 18e.

The adaptor plate 10' is engaged over the end of the guide thimble 4' until the bearing rim 16f comes into contact with the lower surface of the stops 11'a constituting the lower surface 10'a of the adaptor plate, at the periphery of the opening 11'.

Owing to the separation of the rims 16f and 16h, the lower rim 16h of the bearing stops 16e of the sleeve is then slightly above the upper surface 18h of the bearing stops 18d of the ring 18.

The guide thimble can therefore be locked quickly by inserting an end part of a tool into the flared opening 11'd of the adaptor plate and into the crenellations 18c of the ring 18.

The ring 18 can then be turned inside the opening 11' and around the sleeve 16 whose cylindrical surface 16c has a diameter slightly less than the inside diameter of the bearing stops 18d of the ring 18. The ring 18 is turned through 45°, so as to cause the small elastically deformable bosses 18b to pass from one set of four cavities 11'f in the opening 11' arranged at 90° to the second set of openings. Owing to their elasticity, the small bosses 18b can leave the cavities and then engage in the next cavities in order to immobilize the ring 18 in its locked position by snap-fitting.

In the locked position of the ring 18, obtained by rotating through 45° starting from the position represented in FIG. 7, the bearing stops 18d come to face the axial passages 11'b. In this way, the bearing sleeve 16, the bearing rims 16h of whose stops 16e are above the face 18h of a bearing stop 18d of the ring 18, itself resting on the bearing stops 11'a of the opening 11', is immobilized and locked in the axial direction relative to the adaptor plate 10'. All the guide thimbles of the assembly are simultaneously engaged in the adaptor plate and then fixed and locked via the rings 18.

In order to dismount the nozzle 5' including the adaptor plate 10', the locking ring 18 of each of the guide thimbles is turned so as to cause the small elastic bosses to pass from one set of cavities of the opening of the adaptor plate to another. The bearing stops 18d therefore return to the position represented in FIG. 7 in which the axial passages 11'b and 18e arranged in the extension of one another are also in the extension of a bearing stop 16e of the sleeve 16.

Since the four bearing stops of each of the guide thimbles are in the alignment of the axial passages, the nozzle can be separated from the guide thimbles by raising this nozzle in the axial direction of the guide thimbles.

The means for fixing the guide thimbles represented in FIGS. 5, 6 and 7 therefore make it possible very simply and very quickly to fix or dismount the nozzle. The fixing means are additionally arranged inside the opening 11' and have no part projecting above the nozzle. The guide thimble is flush with the upper face of the nozzle or slightly set back into the opening.

Figure 8:
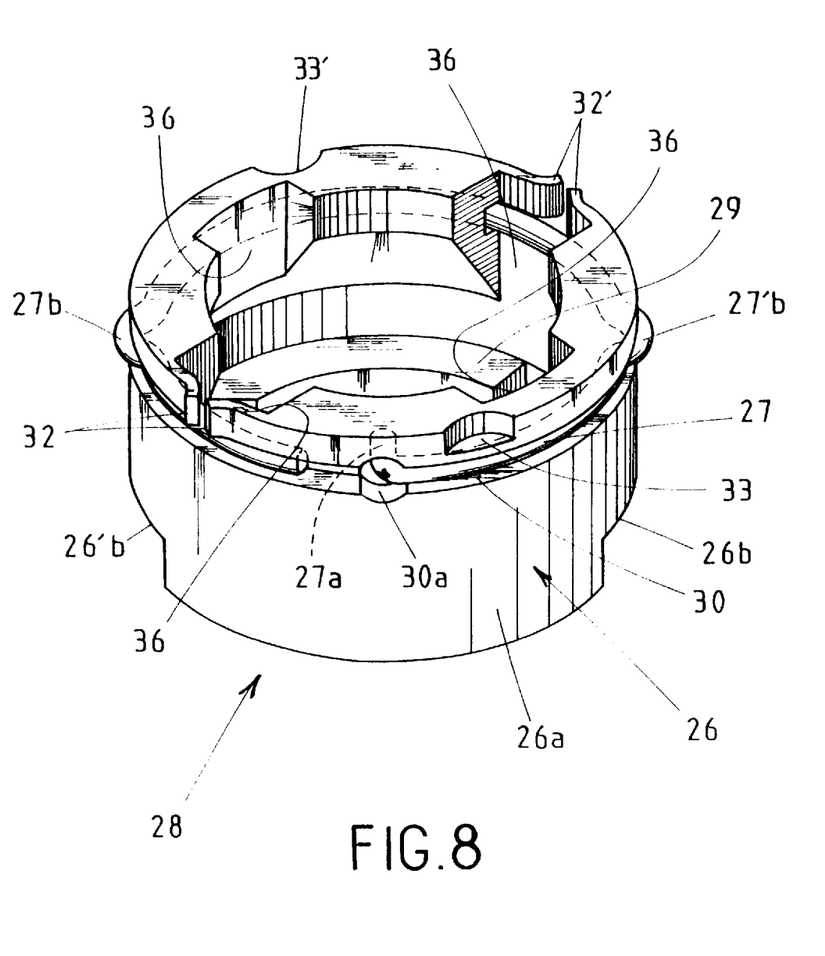
FIG. 8 is a perspective view of a ring according to the alternative.

FIG. 8 shows a ring 28 of the means for dismountably fixing a fuel assembly according to the first embodiment and according to an alternative.

The ring 28, which fulfils the same function as the ring 18 represented in FIGS. 5, 6 and 7, is made of two elements 26 and 27 which are joined together before the ring 28 is introduced into an opening in the nozzle of the fuel assembly.

The first element 26 or ring body 28 is in the form of a component of overall tubular shape which includes various functional parts machined onto its external surface and into its internal bore.

The second element 27 is an open elastic ring produced by winding and folding a rod or wire of circular or square cross-section made of steel having good elasticity.

The body 26 of the ring 28 is machined so that its lower part has two sectors 26a separated from one another by two cutouts 26b and 26'b cut from the wall of the tubular body. The internal part of the sectors 26a projects radially relative to the internal surface of the tubular body 26, so as to constitute two bearing stops 29 having a function similar to that of the stops 18d described above and to delimit between them, at the cutouts 26b and 26'b, two axial passages.

A toric groove 30 is formed on the external part of the body 26, and elastic ring 27 can be engaged over the body 26 by undergoing diametral expansion and snap-fitted into the groove 30. In order to immobilize the ring 27 on the body 26 in terms of rotation, one end 27a of the ring 27, folded inwards, is engaged in a radial hole 30a emerging in the groove 30.

The upper part of ring body 26, above the groove 30, includes two sets 32 and 32' of two stubs machined so that they project radially relative to the external standing surface of the ring body 26.

The two sets of stubs 32 and 32' arranged at 180° from one another about the axis of the ring 28 make it possible to retain the ring axially inside the nozzle in its unlocked position.

The elastic ring 27 is folded in two zones situated at 180° from one another about the axis of the ring in order to constitute two immobilizing stubs 27b and 27'b. When the elastic ring 27 is fixed onto the ring body 26, as represented in FIG. 8, the stubs 27b and 27'b project radially outwards relative to the outer surface of the body 26 and of the groove 30 and placed in perfectly defined positions on the periphery of the ring 28.

Figure 9:
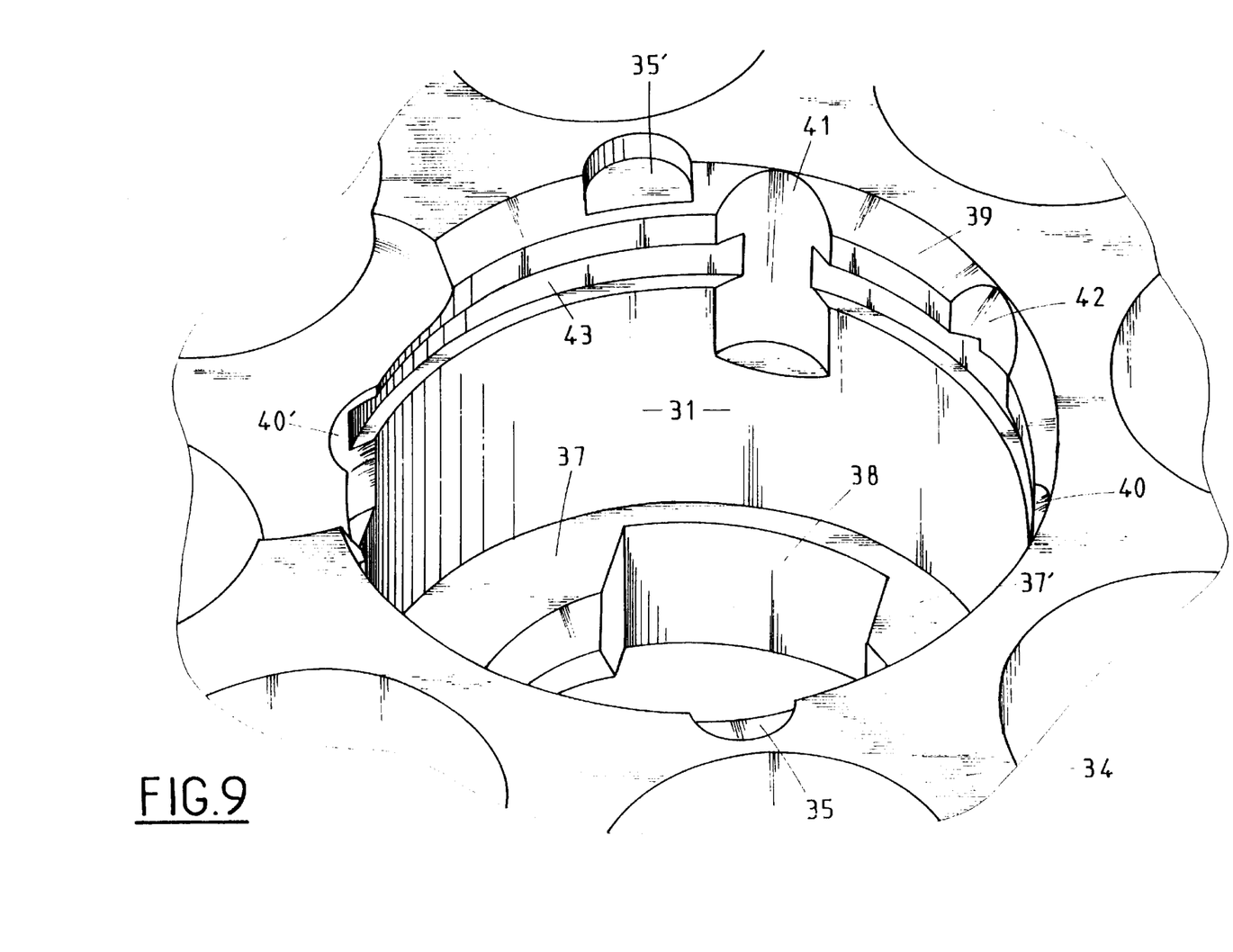
FIG. 9 is a perspective view of the opening of the nozzle according to the alternative.

The upper periphery of body 26 of the ring 28 has two notches 33 and 33' intended to identify the orientation of the ring 28 when it is being inserted in its service positions, inside the opening 31 of a fuel assembly nozzle 34, represented in FIG. 9.

Provided on the edges of the opening 31 (FIG. 9) are two notches 35 and 35' which come into coincidence with the notches 33 and 33' of the ring 28, in the locked position of the ring.

The upper part of body 26 of the ring 28 includes four sectors projecting inwards arranged at 90° from one another separated by crenellations 36 in which branches of a tool allowing the ring 28 to be turned about its axis after it has been fitted in the opening 31 can be engaged.

The opening 31 (FIG. 9) is machined so that it has two internal stops 37 and 37' projecting radially towards the inside of the opening 31 and separated from one another by two axial passages 38.

The stops 37 and 37' are machined over only part of the length of the opening 31, so as to have bearing surfaces perpendicular to the axis of the opening 31, inside the opening. The stops 37 and 37' and the axial passages 38, which have a position similar to that of the stops 11'a and of the axial passages 11'b represented in FIG. 6, have an angular extent in the circumferential direction similar to that of the stops 28 of the ring 29 and of the axial passages between those stops.

The upper part of the opening 31 is flared outwards in the form of a frustoconical surface 39 allowing the introduction and travel of the tool for operating on the ring 28 after it has been inserted into the opening 31.

Two notches 40 and 40' are machined in the upper part of the opening 31 at a distance of 180° about the axis of the opening 31.

Two notches such as 41 are also machined in the frustoconical upper part 39 of the opening 31, at a distance of 180° and at 90° from the notches 40 and 40'.

The notches 40 and 40' are arranged so as to receive the stubs 27b and 27'b of the ring 27 in the locked position of the ring 28. In this position, the stops 29 of the ring cover the axial passages 38 of the opening 31.

The ring 28 can be engaged axially in the opening 31 in its orientation corresponding to the locked position identified by bringing the notches 33 and 33' of the ring 28 into coincidence with the corresponding notches 35 and 35' of the opening 31. The sets of stubs 32 and 32' of the ring 28 therefore face two notches 42 of the opening 31 and the immobilizing stubs 27b and 27'b then face the notches 40 and 40'. The ring 28 can therefore be inserted into the opening 31 without difficulty.

In this position, the ring 28 whose stops 29 close off the axial passages 38 of the opening 31, can lock a guide thimble such as the guide thimble 4' represented in FIGS. 5, 6 and 7 equipped with a bearing sleeve such as the sleeve 16. The axial dimensions of the stops 29 and 37, 37' are such that their sum is substantially equal to or slightly less than the axial distance between the edges 16f and 16h via which the sleeve 16 bears on the nozzle and on the stops of the ring 28, respectively.

The ring 28, in its locked position inside the opening 31, in which the stops 29 come to bear on the stops 37 and 37' of the opening, therefore fixes the guide thimble 4' onto the nozzle of the assembly.

In order to unlock the guide thimble link, the ring 28 is turned through 90° inside the opening 31, using a tool which has branches which are accommodated in the crenellations 36 of the ring, inside the frustoconical part 39 of the opening 31.

The stubs 27b and 27'b of the elastic ring 27 can retract diametrally by deformation of the ring at the beginning of the rotation and leave the notches 40 and 40'.

After the ring has been rotated through 90°, the stubs 27b and 27'b reach the notches 41 and snap-fit into the notches 41 owing to the elasticity of the ring. The ring 28 is then held in an unlocked position in which the axial passages of the ring 28 between the stops 29 are aligned with the axial passages 38 of the opening 31. The guide thimble is no longer held inside the opening 31 of the nozzle.

However, the ring 28 remains held axially inside the opening 31 by the sets of stubs 32 and 32' inserted into a groove 43 machined inside the opening 31 below the cavities 43.

It is equally possible to use a ring which does not have immobilizing stubs such as 32, and 32' and to provide indexing openings 40, 40' which have an outwardly inclined engagement part. The ring is forcibly engaged in the openings 40 and 40'. In the unlocked position, the ring is retained by the rim of the groove 43, the openings 41 having no part emerging on the outside.

Figures 10, 11, 11A:
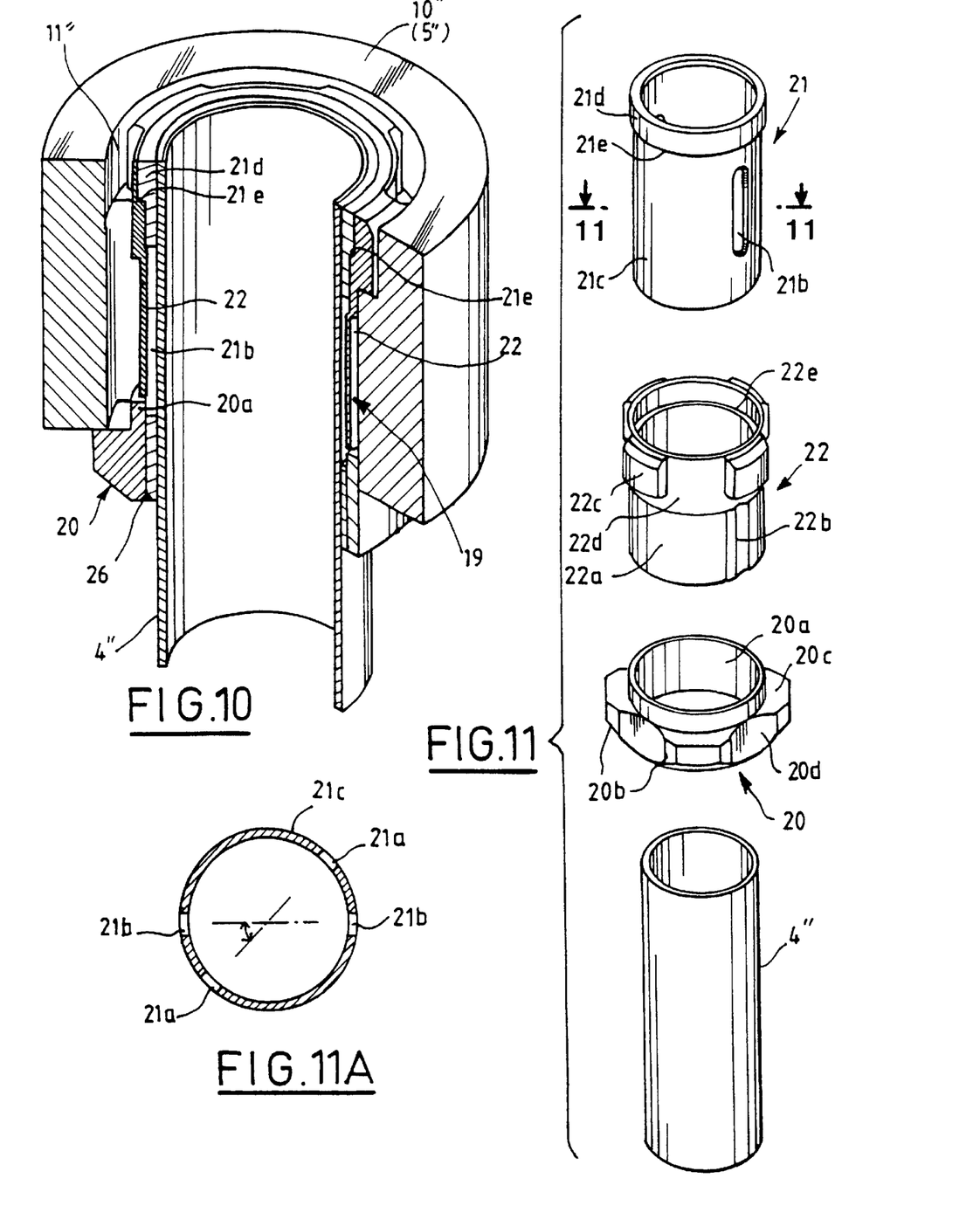
FIG. 10 is a view in perspective with cutaway of the end of the guide thimble engaged and fixed by the fixing means according to the second embodiment inside the opening of the adaptor plate of the nozzle.
FIG. 11 is an exploded perspective view of the fixing means according to the second embodiment, in a non-assembled state.
FIG. 11A is a transverse section along line 11—11 of FIG. 11, of the bearing sleeve of the guide thimble.
Figure 12:
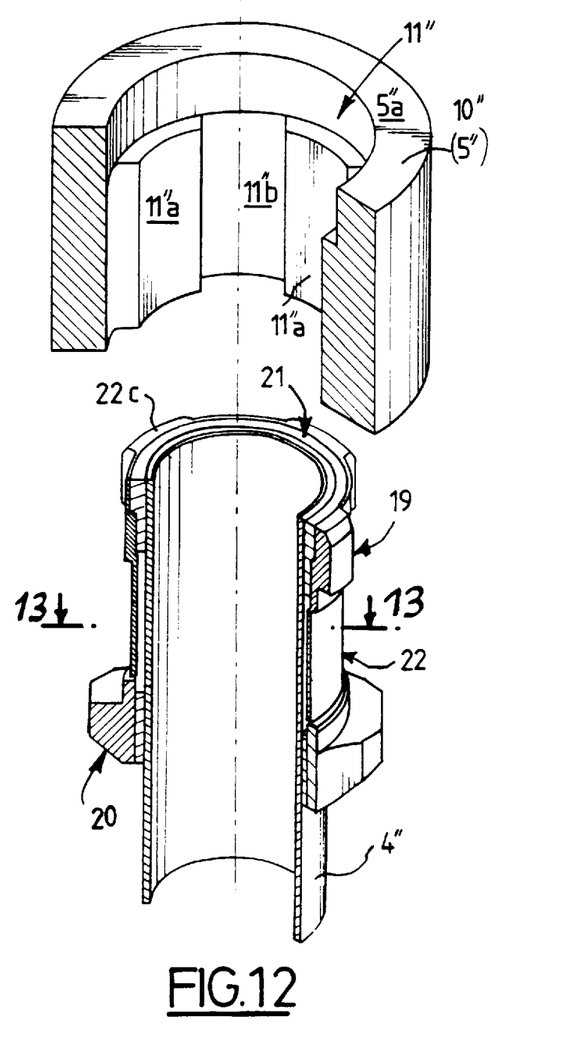
FIG. 12 is an exploded perspective view with cutaway of the end part of the guide thimble and of the fixing means according to the second embodiment in an assembled state, the guide thimble being in a position where it is not engaged inside the opening in the adaptor plate of the nozzle.

FIGS. 10, 11 and 12 show a second embodiment of the means for fixing the end of a guide thimble 4" inside an opening 11" passing through the adaptor plate 10" of a dismountable nozzle 5" of a fuel assembly according to the invention.

In FIG. 10, the fixing means have been represented in their assembled position, the guide thimble being engaged and locked inside the opening 11" of the adaptor plate of the nozzle.

In FIG. 11, the fixing means have been represented in a non-assembled state and in positions allowing their mutual engagement and their assembly.

In FIG. 12, the fixing means have been represented in the assembled state, the guide thimble not being engaged inside an opening in the adaptor plate.

The fixing elements include a bearing sleeve 19 consisting of two components 20 and 21 and a ring 22.

The two parts 20 and 21 of the sleeve 19 are engaged over one another and joined together by a weld 26 after the ring 22 has been engaged and mounted on the part 21 of the bearing sleeve.

The production of the bearing sleeve 19 in two parts makes it possible to mount the ring 22 which is mounted captive and so that it can rotate on the bearing sleeve.

After the bearing sleeve 19 and the ring 22 have been assembled, the bearing sleeve 19 is engaged over the end of the guide thimble 4" and fixed to the latter by a weld.

The means of fixing the guide thimble also includes the opening 11" passing through the adaptor plate 10" which is machined to interact with the ring 22 and the bearing sleeve 19.

Figure 13:
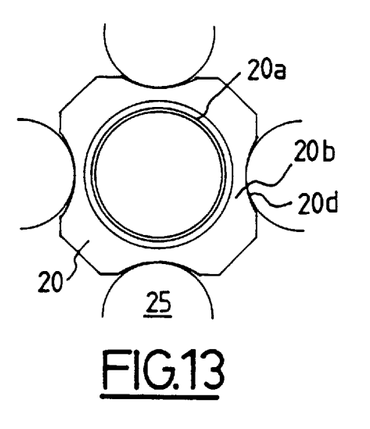
FIG. 13 is a view in transverse section along line 13—13 of FIG. 12 of part of the means for fixing the guide thimble interposed between fuel rods of the assembly according to the invention.

The part 20 of the bearing sleeve is in the form of an annular component including a cylindrical internal bore 20a and a collar projecting outwards 20b including a bearing surface 20c perpendicular to the axis of the component 20 and four peripheral indentations 20d to allow the passage of four fuel rods 25, while they are being extracted or inserted into the fuel assembly, as represented in FIG. 13.

The component 21 of the bearing sleeve 19 includes a cylindrical hoop 21c, whose outside diameter is slightly less than the inside diameter of the cylindrical hoop 20a of the component 20.

As shown particularly in FIGS. 11 and 11A, the hoop 21c of the component 21 has oblong openings of 21a and 21b passing through it, the openings 21a being arranged opposite each other across a diameter of the hoop 21c, and the openings 21b being arranged opposite each other across a second diameter of the hoop 21c forming an angle of 45° with the diameter across which the openings 21a are aligned.

The component 21 of the bearing sleeve 19 includes an upper part 21d whose thickness is greater than the thickness of the hoop 21c.

The lower rim of the part 21d constitutes an annular bearing rim 21e.

As shown in FIG. 10, the opening 11" passing through the adaptor plate 10" is machined to constitute four bearing stops 11"a arranged at 90° from one another about the axis of the opening 11" separated by axial passages 11"b.

The ring 22 includes a lower part 22a consisting of a cylindrical hoop, whose wall is deformed in two diametrally opposite regions in order to constitute two elastically deformable radial parts 22b pointing towards the inside of the hoop 22a.

The upper part of ring 22 includes four bearing stops 22c arranged at 90° from one another and separated by passages 22d in the axial direction of the external lateral surface of the hoop of the ring 22.

The width in the circumferential direction of the bearing stops 22c corresponds substantially to the width of the passages 11"b of the opening 11", and the width of the axial passages 22d in the circumferential direction corresponds substantially to the width in the circumferential direction of the stops 11"a of the opening 11".

In this way, as will be explained later, the assembly formed by the bearing sleeve 19 and ring 22 which are fixed onto the end part of the guide thimble 4", as represented in FIG. 12, is capable of being engaged in the axial direction inside the opening 11".

The internal bore of the ring 22 includes two successive parts having different diameters, the diameter upper part of the bore being greater than the diameter of the lower part of the bore. Between these two parts of different diameter of the interior bore of the ring 22, there is provided a rim 22e whose shape corresponds to the shape of the rim 21e of the component 21 of the bearing sleeve.

The components 20, 21 and 22 represented in FIG. 11 are joined together and fixed to the end of the thimble 4" in the way represented in FIG. 12.

Firstly, the ring 22 is engaged, via its internal bore, over the component 21 via the lower part of the hoop 21c. The rim 22e of the internal bore of the ring 22 comes into contact with the correspondingly shaped rim 21e of the component 21.

The hoop 21c of the component 21 is engaged in the bore of the hoop 20a, over the entire length of the hoop 20a. The lower part of the shell 22a of the ring 22 rests on the end of the hoop 20a of the component 20.

The component 20 and the component 21 of the bearing sleeve 19 are fixed by a weld 26.

The end of the guide thimble 4" is engaged inside the component 21 over its entire length and a connecting weld is made between the component 21 of the bearing sleeve and the end part of the guide thimble 4".

The end part of the thimble 4", the bearing sleeve 19 and the ring 22 are therefore in their assembled position, represented in FIG. 12.

The elastically deformable parts 22b of the ring 22 are engaged in the slots 21a of the bearing sleeve 19. The ring 22 is thus held on the bearing sleeve 19 in a position whose orientation is defined.

In this position, the adaptor plate 10" of the dismountable nozzle 5" can be engaged over the end of the guide thimble 4" so that the bearing stops 22c move by sliding inside the passages of axial direction 11"b of the opening 11" of the adaptor plate.

Simultaneously, the bearing stops 11"a of the opening 11" of the adaptor plate move by sliding inside the axial passages 22d of the ring 22 held in a fixed orientation at the end of the thimble 4".

The adaptor plate 10" is engaged on the thimble 4" until the bearing rim 20c of the component 20 of the bearing sleeve 19 comes into contact with the lower parts of the stops 11'a, at the peripheral part of the opening 11" of the adaptor plate.

The distance in the axial direction between the rim 20c and the lower rim of the bearing stops 22c of the ring 22 is such that in this position, the lower bearing rims of the stops 22c are above the upper rims of the bearing stops 11"a of the opening 11".

The ring 22 is then turned, using a tool including actuating parts which are engaged from above the adaptor plate 10" between the bearing stops 22c of the ring 22 inside the upper part of the opening 11", until the elastically deformable parts 22b of the ring 22 have passed from the slots 21a to the slots 21b of the hoop 21c of the component 21 of the sleeve.

The ring 22 is mounted captive between the components 20 and 21 of the bearing sleeve 19 and is free to rotate about the component 21, particularly via its bearing rim 22e, which is engaged over the external rim 21e of the component 21.

When the elastically deformable parts 22b have engaged in the slots 21b of the component 21 of the sleeve, the ring 22 is indexed into the locked position of the guide thimble, the lower bearing rim of the stops 22c being located vertically in line with the upper rims of the bearing stops 11"a in the opening 11" of the adaptor plate 10".

A set of openings of the adaptor plate 10" is simultaneously engaged over the set of guide thimbles of the assembly. The end part of each of the guide thimbles 4" is then locked in succession onto the adaptor plate 10".

In order to unlock each of the thimbles of the assembly, the tool allowing the ring 22 of each of the assemblies for fixing the guide thimbles to be turned is used to place this ring in an unlocked position, in which the elastically deformable parts 22b engage in the openings 21a in the sleeve.

The stops 22c of the ring 22 are then in alignment with the axial passages 11"b between the bearing stops 11"a of the opening 11" of the adaptor plate.

When all the guide thimbles of the assembly are unlocked, the dismountable top nozzle is separated from the ends of the guide thimbles by lifting the nozzle in the axial direction of the assembly.

The fuel assemblies according to the invention therefore include quick means for locking or unlocking the connections between the guide thimbles and the adaptor plate of a dismountable nozzle.

Furthermore, the means for fixing the guide thimble are entirely arranged inside the opening in the nozzle.

In the case of the first embodiment represented in FIGS. 5 to 7 and of its alternative represented in FIGS. 8 and 9, the locking and unlocking ring remains fixed inside the adaptor plate of the fuel assembly, and loads are transmitted between each of the guide thimbles and the nozzle of the assembly via the bearing stops of the sleeve and the bearing stops of the ring which come to rest on the bearing stops of the opening in the adaptor plate.

In the case of the second embodiment represented in FIGS. 10, 11 and 12, the locking and unlocking ring remains fixed to the bearing sleeve of the guide thimble and the loads exerted between the guide thimble and the adaptor plate are transmitted via the ring whose bearing surfaces come into contact with the bearing surfaces of the adaptor plate.

In any case, the means for fixing the guide thimble are arranged entirely inside the nozzle and the end of the guide thimble is flush with or slightly set back relative to the external face of the nozzle.

Furthermore, no radioactive waste is produced when dismounting the fixing, in contrast with the case of fuel assemblies including a thimble fixed into the nozzle by an immobilizing sleeve which has to be formed at the moment of dismounting, and which is not recovered. Once the assembly has been dismounted, the immobilizing sleeves constitute waste which has to be disposed of; the disposal of radioactive waste requires precautions and gives rise to additional service costs of the nuclear reactor.

Although a dismountable assembly including guide thimbles has been described, the invention applies equally to the case of nuclear fuel assemblies including solid ties fixed dismountably to the nozzles at their ends.

The bearing sleeves, locking rings and through-openings in the adaptor plate of the assembly may have a shape different from the shapes which have been described.

In particular, the ring and the opening in the adaptor plate may include a different number of bearing stops having shape different from those which have been described. The ring may include one or more small bosses or one or more stubs in order to immobilize it in the opening of the nozzle or on the bearing sleeve.

The bearing sleeve of the guide thimble may comprise one or more components with or without bearing stops and with or without cavities for immobilizing the ring in its locked and unlocked positions. Those parts of the elastically deformable ring intended to be accommodated in the cavities of the opening of the adaptor plate or of the sleeve may have shapes different from those which have been described.

The invention applies to any fuel assembly for nuclear reactors cooled by light water including a dismountable nozzle.

We claim:

1. A dismountable fuel assembly of a nuclear reactor cooled by light water including a bundle of parallel fuel rods held in a framework formed by one of guide thimbles and solid ties, spacers and end nozzles fixed onto ends of said ones of guide thimbles and solid ties, at least one of said end nozzles being dismountably fixed onto one of said ends of each of said ones of guide thimbles and solid ties, via an end part of said ones of the guide thimbles and solid ties which is engaged in an opening passing through a transverse adaptor plate of said end nozzle, said adaptor plate being associated with quick dismountable means for fixing said one of said guide thimbles and solid ties, said quick dismountable means including:

(a) a bearing sleeve integral with the end of said one of guide thimbles and solid ties, comprising a bearing rim and at least two first bearing stops separated by at least two first axial passages, said bearing rim and said first bearing stops protruding radially outward and being axially spaced from each other;

(b) said opening through said adaptor plate having at least two inwardly projecting bearing stops separated by at least two second axial passages and including a bearing surface perpendicular to an axis of said opening, and at least one cavity projecting radially outward; and (c) a ring coaxially mounted and rotatable around said bearing sleeve in said opening through said adaptor plate, said ring including at least two third bearing stops projecting radially inward and separated by at least two third passages and at least one part elastically deformable in a radially outward direction;

(d) said stops and said passages of said bearing sleeve, said opening and said ring being so arranged that said bearing sleeve is axially displaceable in said opening up to an operational position in which said bearing rim bears against said adaptor plate around said opening and said ring is insertable in said opening around said bearing sleeve, said third bearing stops of said ring being axially disposed between said first and said second bearing stops and being rotatable between an unlocked position in which said third passages of said ring are aligned with said passages of said opening and a locked position in which said at least one elastically deformable part of said ring is received in said cavity of said opening and said third stops of said ring face said second passages of said opening.

2. The fuel assembly according to claim 1, wherein:

(a) said opening in said adaptor plate includes at least two cavities spaced from one another circumferentially of said opening;

(b) the ring includes at least one elastically deformable element having at least one part projecting radially outward and being accommodated in a cavity of said opening, and at least one engaging part for turning said ring inside said opening between said unlocked position in which said third bearing stops and said third axial passages of said ring are in an axial extension of said second bearing stops and of said second axial passages of said opening, respectively, and said locked position in which said third bearing stops of said ring face said second axial passages of said opening; and said first bearing stops of said bearing sleeve are in an axial extension of said second passages of said opening.

3. The fuel assembly according to claim 2, wherein said ring includes a tubular ring body inside which said bearing stops of said ring project radially relative to an internal surface of said ring body, and an elastic ring engaged around said ring body including at least one stub constituting the elastically deformable part projecting radially towards an outside of said ring for being received in a cavity of said opening of said adaptor plate.

4. The fuel assembly according to claim 3, wherein the elastic ring is engaged inside a groove machined in the external peripheral part of the ring body and includes a free end engaged in a radial hole of the ring body.

5. The fuel assembly according to claim 3, wherein one of said ring body and said elastic ring includes at least two stubs for axially holding the ring inside said opening, said stubs being engaged in a groove on said internal surface of said ring body.

6. The fuel assembly according to claim 1, wherein each of said first bearing stops of said bearing sleeve includes a rim facing said bearing rim of said bearing sleeve whose distance to said bearing rim axially of said bearing sleeve is greater than a sum of axial dimensions of a second bearing stop of said opening of said adaptor plate and of a third bearing stop of said ring.

7. The fuel assembly according to claim 1, wherein said bearing sleeve includes an external cylindrical surface for engaging an inner cylindrical surface of said second bearing stops of said opening of said adaptor plate to center the guide thimble inside said opening.

8. The fuel assembly according to claim 2, wherein said opening of said adaptor plate includes an outwardly flared substantially frustoconical part for engagement of a tool for gripping said ring in order to rotate it between locked and unlocked positions.

\* \* \* \* \*